United States Patent
Mochizuki et al.

(10) Patent No.: US 9,623,288 B2
(45) Date of Patent: Apr. 18, 2017

(54) TABLE TENNIS BALL AND TABLE TENNIS BALL-USE THERMOPLASTIC RESIN COMPOSITION

(71) Applicants: Nippon Takkyu Co., Ltd., Tokyo (JP); Toray Industries, Inc., Tokyo (JP)

(72) Inventors: Hidenori Mochizuki, Tokyo (JP); Hitoshi Egawa, Tokyo (JP); Tetsu Sato, Koga (JP); Tadakatsu Takasaki, Ichihara (JP); Satoshi Toki, Tokyo (JP)

(73) Assignees: Nippon Takkyu Co., Ltd. (JP); Toray Industries, Inc. (JP)

( * ) Notice: Subject to any disclaimer, the term of this patent is extended or adjusted under 35 U.S.C. 154(b) by 0 days.

(21) Appl. No.: 14/787,028

(22) PCT Filed: Apr. 16, 2014

(86) PCT No.: PCT/JP2014/060788
§ 371 (c)(1),
(2) Date: Oct. 26, 2015

(87) PCT Pub. No.: WO2014/175132
PCT Pub. Date: Oct. 30, 2014

(65) Prior Publication Data
US 2016/0074713 A1    Mar. 17, 2016

(30) Foreign Application Priority Data

Apr. 26, 2013 (JP) ................. 2013-094090
Apr. 26, 2013 (JP) ................. 2013-094118

(51) Int. Cl.
| | | |
|---|---|---|
| A63B 39/00 | (2006.01) | |
| A63B 39/08 | (2006.01) | |
| A63B 45/00 | (2006.01) | |
| B29D 22/04 | (2006.01) | |
| C08L 9/06 | (2006.01) | |
| C08L 51/00 | (2006.01) | |
| A63B 102/16 | (2015.01) | |

(52) U.S. Cl.
CPC .............. *A63B 39/00* (2013.01); *A63B 39/08* (2013.01); *A63B 45/00* (2013.01); *B29D 22/04* (2013.01); *C08L 9/06* (2013.01); *C08L 51/00* (2013.01); *A63B 2039/003* (2013.01); *A63B 2102/16* (2015.10); *A63B 2209/00* (2013.01); *C08L 2205/03* (2013.01)

(58) Field of Classification Search
USPC ............. 473/609; 428/403; 524/145
See application file for complete search history.

(56) References Cited

U.S. PATENT DOCUMENTS

| | | | | |
|---|---|---|---|---|
| 2007/0100089 | A1* | 5/2007 | Nesbitt | A63B 37/0003 525/452 |
| 2010/0009791 | A1 | 1/2010 | Yoo et al. | |
| 2012/0028047 | A1* | 2/2012 | Imai | C08J 5/04 428/403 |
| 2012/0178860 | A1* | 7/2012 | Nakamoto | C08L 69/00 524/145 |

FOREIGN PATENT DOCUMENTS

| | | |
|---|---|---|
| CN | 1057790 | 1/1992 |
| CN | 102896788 A | 1/2013 |
| GB | 1131321 A | 10/1968 |
| JP | 45-24151 B | 8/1970 |
| JP | 50-17897 B1 | 6/1975 |
| JP | 54-81936 A | 6/1979 |
| JP | 56-130329 A | 10/1981 |
| JP | 2009-507589 A | 2/2009 |
| WO | 2007/031315 A1 | 3/2007 |
| WO | 2010/111920 A1 | 10/2010 |

OTHER PUBLICATIONS

Chinese Office Action dated Mar. 7, 2016, from corresponding Chinese Patent Application No. 201480023367.3, along with an English translation.
Supplemental European Search Report dated Apr. 12, 2016, from corresponding European Patent Application No. 14787557.9.
Japanese Office Action dated May 12, 2015, from corresponding Japanese Patent Application No. 2014-549227, along with an English translation.
"The Ball (Version for 40mm Balls) Technical Leaflet T3", The International Table Tennis Federation, May 2013, pp. 1-9.

\* cited by examiner

*Primary Examiner* — Aarti B Berdichevsky
*Assistant Examiner* — Christopher Glenn
(74) *Attorney, Agent, or Firm* — DLA Piper LLP (US)

(57) ABSTRACT

A table tennis ball faithfully reproduces the playing characteristics of celluloid table tennis balls without using celluloid, and a thermoplastic resin composition for table tennis balls provides a table tennis ball having an excellent balance of elastic modulus, impact resistance, and density. The table tennis ball is composed of a celluloid-free thermoplastic resin or thermoplastic resin composition having a flexural modulus according to ISO 178 of 1650 MPa or more, a Charpy impact strength according to ISO 179 of 20 kJ/m$^2$ or more, and a density according to ISO 1183 of less than 1.20 g/cm$^3$, has a diameter of 39.0 mm or more, and weighs 2.0 to 3.5 g.

12 Claims, No Drawings

TABLE TENNIS BALL AND TABLE TENNIS BALL-USE THERMOPLASTIC RESIN COMPOSITION

TECHNICAL FIELD

This disclosure relates to a celluloid-free table tennis ball that faithfully reproduces the playing characteristics exhibited when celluloid table tennis balls are used, and a thermoplastic resin composition for table tennis balls.

BACKGROUND

Celluloid has been used as a material of a table tennis ball since around 1930. Celluloid, however, has drawbacks in that it is extremely flammable, readily ignited, for example, by friction, readily deteriorated, for example, by light, and less durable. Thus, in factories in which celluloid is used, celluloid has often caused a fire by ignition due to its autoreactivity and, in Japan, celluloid is designated as a combustible regulated subject (hazardous material in Category V) according to Fire Service Act, and the method of producing, storing, and handling celluloid is strictly prescribed.

In addition, by the influence of light, oxygen, or the like over a long period of time, celluloid is dissociated into cellulose and nitric acid and deteriorated and, consequently, it tends to cause "stickiness" and "cracks" and is difficult to store stably for a long period of time. Furthermore, the strongly acidic gas (nitric acid) that generates during the dissociation process may corrode, for example, the surrounding celluloid and metals.

For table tennis balls, there is a standard established by International Table Tennis Federation (hereinafter referred to as ITTF). This standard is disclosed in Technical Leaflet T3 of ITTF (The Ball (Version for 40 mm Balls) Technical Leaflet T3). The following is an excerpt therefrom.

Excerpt from ITTF Technical Leaflet T3

- - -

Laws

The Laws of Table Tennis relating to the ball are as follows:

| | | |
|---|---|---|
| 2.03 | | The Ball |
| 2.03.01 | | The ball shall be spherical with a diameter of 40 mm. |
| 2.03.02 | | The ball shall weigh 2.7 g. |
| 2.03.03 | | The ball shall be made of celluloid or similar plastics material and shall be white or orange, and matt. |

Material

Notwithstanding the instability and flammability of celluloid, it has always been the standard material for a table tennis ball. The Laws do not prescribe the material, leaving manufacturers free to experiment. We need a better material, and manufacturers are encouraged to search for one.

- - -

Technical Leaflet T3 states that the table tennis ball has a diameter of 40 mm, weighs 2.7 g, has a "matt" surface, and made of celluloid or a plastics material having properties similar to those of celluloid, and the material of the ball is not prescribed. It also suggests that since celluloid balls have been used for many years, the standard specification has been established, but at the same time, ITTF is expecting the development of excellent new materials to replace celluloid.

Table tennis is a sport that requires dynamic visual acuity, reflexes, high explosiveness, and stamina, and requires an overall ability including technical ability and physical ability. In table tennis at a beginner/intermediate level, technical ability is more important than physical ability, but table tennis at a higher level requires a high physical ability similarly to other sports.

On the other hand, table tennis is also a simple sport that can be played if there are two or more people irrespective of age and sex and, therefore, is very popular also by the name of ping-pong to such an extent that there are few people who have not played once. The name ping-pong is derived from the batted ball sound in a rally, and the sport is rare in which the batted ball sound is regarded as so important and which is very popular.

Hence, the table tennis ball requires essential material properties, and also the batted ball sound requires severe conditions. Thus, celluloid is being used even today such a wide variety of plastics are available.

Changing the material, the influence of which is evident when a table tennis ball is hit hard as compared to when hit lightly, may change the batted ball sound, decrease the speed, or lead to increased mistakes, resulting in an unexpected point loss during play. In addition, sounding like cracking mentally influences players. Only a slight difference may lead to too much or too little bounce, and it may be impossible to carry out a match. Thus, the material properties required for table tennis balls is inevitably the properties of celluloid.

Hence, what is required for a new material is not only resin properties expressed by numerical values equivalent to those of celluloid, and importance should be placed on subjective opinions of players, who actually played using a table tennis ball made of the new material, on the feeling of the play, the bounce, and the feeling of batted ball.

Proposals for a material of table tennis balls to replace celluloid have been made before. For example, WO 2007/31315 discloses a table tennis ball composed of a plastic whose main component is an organic non-cross-linked polymer having in its main chain not only carbon atoms but also heteroatoms.

JP 50-17897 B discloses a table tennis ball formed from a thermoplastic material selected from the group consisting of acrylonitrile-styrene-acrylic elastomer copolymer, acrylonitrile-butadiene-styrene copolymer, polyvinyl chloride, polycarbonate, nylon 6, polyethylene, and polypropylene.

To improve the hitting characteristics (ball release from a racket, batted ball sound) of the table tennis ball provided by JP 50-17897 B, JP 54-81936 A discloses a table tennis ball obtained in such a manner that inorganic matter is added to a thermoplastic synthetic resin, the inorganic matter having a higher specific gravity than that of the thermoplastic synthetic resin; a fiber is added thereto and mixed; and the homogenized material is molded.

WO 2010/111920 discloses a table tennis ball that is a hollow and sealed spherical shell formed in one piece and provided with a continuous interior surface.

Table tennis is a sport popular with many people, and the characteristics of this sport are supported by excellent characteristics of table tennis balls. Notwithstanding the known instability and dangerous flammability of celluloid, a material of table tennis balls, there is still not a table tennis ball made of other materials than celluloid, which is because the playing characteristics of celluloid table tennis balls cannot be reproduced.

It is said that the speed of a table tennis ball immediately after being hit by a top-class player is as fast as 200 km/hr, and if the ball is cracked or deformed the moment it is hit, it is impossible to carry out a match. Thus, impact resistance, hardness, and elasticity of the ball are important factors.

The table tennis ball disclosed in WO 2007/31315, which is composed of a high-density plastic, is thin-walled and has poor impact resistance, and thus has a drawback in that the ball may be cracked when batted. The table tennis balls disclosed in JP 50-17897 B and JP 54-81936 A also have poor impact resistance, and thus have a drawback in that the ball may be cracked when batted. The table tennis ball disclosed in WO 2010/111920 is distinctly different from celluloid balls in the feeling of batted ball and impact resistance, and has not been practically used as a substitute for celluloid table tennis balls.

Thus, it could be helpful to provide a table tennis ball that can faithfully reproduce the playing characteristics of celluloid table tennis balls without using celluloid, and to provide a thermoplastic resin composition for table tennis balls that can provide a table tennis ball having an excellent balance of elastic modulus, impact resistance, and density.

We studied the properties required to reproduce the playing characteristics of celluloid table tennis balls through actual trials by table tennis players. We discovered that the playing characteristics of celluloid table tennis balls can be reproduced when the thermoplastic resin constituting a table tennis ball has specific mechanical properties.

Thus, we provide a table tennis ball that has a diameter of 39.0 mm or more and a weight of 2.0 to 3.5 g, and composed of a celluloid-free thermoplastic resin or thermoplastic resin composition having a flexural modulus according to ISO 178 of 1650 MPa or more, a Charpy impact strength according to ISO 179 of 20 kJ/m$^2$ or more, and a density according to ISO 1183 of less than 1.20 g/cm$^3$. We also provide a thermoplastic resin composition for table tennis balls, comprising: a rubber-reinforced thermoplastic resin (A) containing a rubbery polymer (a); and an ethylene-carbon monoxide-(meth) acrylic ester copolymer (C); wherein the rubbery polymer (a) contains poly(butadiene-styrene); the component (A) and the component (B) are contained in an amount of 94 to 97 parts by weight and 3 to 6 parts by weight, respectively, based on 100 parts by weight of the total amount of (A) and (C); and the weight percentages of the components based on 100% by weight of the total amount of (A) and C) satisfy Expressions (1) and (2):

$$11.2 \leq [\text{Weight percentage of } (a)/\{\text{Weight percentage of } (A)+\text{Weight percentage of }(C)\}] \times 100 \leq 14.5 \quad (1)$$

$$[\{\text{Weight percentage of }(a)+\text{Weight percentage of }(C)\}/\{\text{Weight percentage of }(A)+\text{Weight percentage of }(C)\}] \times 100 < 18.5 \quad (2).$$

Our table tennis balls can faithfully reproduce the playing characteristics of celluloid table tennis balls without using celluloid. Furthermore, according to the thermoplastic resin composition for table tennis balls, a table tennis ball having an excellent balance of elastic modulus, impact resistance, and density can be provided.

DETAILED DESCRIPTION

Our table tennis balls will now be described in detail.

Our table tennis balls are formed from a celluloid-free thermoplastic resin or thermoplastic resin composition (hereinafter also referred to collectively as "thermoplastic resin"). There is no particular limitation on the thermoplastic resin or thermoplastic resin composition as long as it is celluloid-free and has a flexural modulus according to ISO 178 of 1650 MPa or more, a Charpy impact strength according to ISO 179 of 20 kJ/m$^2$ or more, and a density according to ISO 1183 of less than 1.20 g/cm$^3$.

The flexural modulus according to ISO 178 of the thermoplastic resin is 1650 MPa or more from the standpoint of batted ball deformation, bounce, and batted ball sound. If the flexural modulus is less than 1650 MPa, a ball may be deformed and dented when batted, or the ball, if not deformed, does not bounce well. Furthermore, the batted ball sound is low, and a pleasant playing sound cannot be achieved. The flexural modulus is preferably 1800 MPa or more, more preferably 2000 MPa or more, still more preferably 2100 MPa or more, yet still more preferably 2150 MPa or more, and even still more preferably 2200 MPa or more. The upper limit of the flexural modulus according to ISO 178 is not limited to a particular value and, generally, is not more than 3500 MPa, preferably not more than 3000 MPa.

The flexural modulus of the thermoplastic resin can be measured in accordance with ISO 178 using a type A test specimen prepared by injection molding pellets of the thermoplastic resin in accordance with ISO 294.

The Charpy impact strength according to ISO 179 of the thermoplastic resin is 20 kJ/m$^2$ or more from the standpoint of ball strength. If the Charpy impact strength is less than 20 kJ/m$^2$, a ball may be cracked when batted hard. The Charpy impact strength is preferably 24 kJ/m$^2$ or more, more preferably 26 kJ/m$^2$ or more, still more preferably 27 kJ/m$^2$ or more, yet still more preferably 28 kJ/m$^2$ or more, and even still more preferably 30 kJ/m$^2$ or more. The upper limit of the Charpy impact strength is not limited to a particular value and, generally, is not more than 90 kJ/m$^2$, preferably not more than 85 kJ/m$^2$.

The Charpy impact strength of the thermoplastic resin can be measured in accordance with ISO 179 using a type A test specimen prepared by injection molding pellets of the thermoplastic resin in accordance with ISO 294 and V-notched in accordance with ISO 2818.

The density according to ISO 1183 of the thermoplastic resin is less than 1.20 g/cm$^3$ from the standpoint of strength. For a table tennis ball weighing only a few grams, the density of the thermoplastic resin is a determining factor of the thickness which influences the strength of the ball. If the density is not less than 1.20 g/cm$^3$, a ball will have a reduced hardness and impact resistance because the wall thickness of the ball with the same diameter needs to be thin. The density is preferably less than 1.19 g/cm$^3$, more preferably 1.10 g/cm$^3$ or less, and still more preferably 1.06 g/cm$^3$ or less. The lower limit of the density is not limited to a particular value and, generally, is not less than 1.00 g/cm$^3$, preferably not less than 1.01 g/cm$^3$.

The density of the thermoplastic resin can be measured in accordance with ISO 1183 using a type A test specimen prepared by injection molding pellets of the thermoplastic resin in accordance with ISO 294.

Examples of the thermoplastic resin having the above properties include a rubber-reinforced thermoplastic resin (A) containing a rubbery polymer (a). The rubber-reinforced thermoplastic resin (A) can provide a ball with an improved batting feel and impact resistance.

Examples of the rubbery polymer (a) include diene rubbers, acrylic rubbers, ethylene rubbers, and natural rubbers. Specific examples include polybutadiene, poly(butadiene-styrene), poly(butadiene-acrylonitrile), polyisoprene, poly(butadiene-butyl acrylate), poly(butadiene-methyl acrylate), poly(butadiene-methyl methacrylate), poly(butadiene-ethyl acrylate), ethylene-propylene rubber, ethylene-propylene-diene rubber, poly(ethylene-isobutylene), poly(ethylene-methyl acrylate), poly(ethylene-ethyl acrylate), and materials (natural rubbers) composed mainly of cis-poly-1,4-isoprene, which are contained in the sap of rubber trees. Any two or more of them may be used. Of these, to further improve the elastic modulus and the impact resistance, diene rubbers are preferred; polybutadiene or poly(butadiene-styrene) is more preferred; and poly(butadiene-styrene) is still more preferred.

The amount of poly(butadiene-styrene) in the rubbery polymer (a) is preferably not less than 20% by weight, more preferably not less than 30% by weight. The molar ratio of butadiene to styrene in poly(butadiene-styrene), though not limited to, is preferably not less than 0.10 mole, more preferably not less than 0.11 mole of styrene per 1 mole of butadiene. On the other hand, the ratio is preferably not more than 0.50 moles, more preferably not more than 0.45 moles of styrene per 1 mole of butadiene.

To further improve the impact resistance, the average particle size of the rubbery polymer (a) is preferably not less than 0.1 μm, more preferably not less than 0.15 μm, and still more preferably not less than 0.5 μm. On the other hand, to improve the moldability, flowability, and appearance, it is preferably not more than 2.0 μm, more preferably not more than 1.5 μm, and still more preferably not more than 1.2 μm.

The average particle size of the rubbery polymer (a) refers to a particle size at 50% cumulative weight fraction determined from the weight percentage of creamed polybutadiene and the cumulative weight fraction of sodium alginate concentration by the sodium alginate method described in "Rubber Age Vol. 88, p. 484-490 (1960), by E. Schmidt, P. H. Biddison", i.e., by using the fact that the particle size of creamed polybutadiene varies depending on the concentration of sodium alginate.

Examples of the rubber-reinforced thermoplastic resin (A) comprising the rubbery polymer (a) (hereinafter also referred to as "(A) the rubber-reinforced thermoplastic resin") include rubber-containing graft copolymers having a salami structure obtained by graft copolymerization of the rubbery polymer (a) and a free-radical polymerizable monomer; rubber-containing block copolymers obtained by block copolymerization of the rubbery polymer (a) and a free-radical polymerizable monomer; core-shell rubbers having a layered structure composed of the rubbery polymer (a), and a styrene monomer, an unsaturated carboxylic acid alkyl ester monomer, or the like; and an onion structure, which is between the salami structure and the core-shell structure, having a multilayer structure formed by the rubbery polymer (a) and other resin components. Of these, rubber-containing graft copolymers are preferred.

Examples of the rubber-reinforced thermoplastic resin (A) include acrylonitrile-butadiene-styrene (ABS) resins, methyl methacrylate-acrylonitrile-butadiene-styrene (MABS) resins, acrylonitrile-styrene-acrylate (ASA) resins, and acrylonitrile-ethylene-styrene (AES) resins. Two or more of these may be used. Of these, ABS resins are preferred because the balance between impact resistance and moldability (melt viscosity) can be achieved at a higher level.

As the rubber-containing graft copolymer described above, a rubber-containing graft copolymer (I) obtained by copolymerization of a monomer mixture comprising at least a vinyl cyanide monomer and an aromatic vinyl monomer in the presence of the rubbery polymer (a) is preferred. The monomer mixture may optionally comprise any other vinyl monomer copolymerizable with the vinyl cyanide monomer and the aromatic vinyl monomer.

Examples of vinyl cyanide monomers include acrylonitrile, methacrylonitrile, and ethacrylonitrile. Two or more of these may be used. Of these, acrylonitrile is preferred.

Examples of aromatic vinyl monomers include styrene, α-methylstyrene, p-methylstyrene, vinyl toluene, t-butylstyrene, o-ethylstyrene, o-chlorostyrene, and o,p-dichlorostyrene. Two or more of these may be used. Of these, styrene and α-methylstyrene are preferred.

Examples of copolymerizable other vinyl copolymers include unsaturated carboxylic acid alkyl esters such as methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyl (meth)acrylate, and 2,3,4,5-tetrahydroxypentyl (meth)acrylate; maleimide compounds such as N-methylmaleimide, N-cyclohexylmaleimide, and N-phenylmaleimide; and unsaturated amides such as acrylamide. Two or more of these may be used. Of these, unsaturated carboxylic acid alkyl esters are preferred, and methyl methacrylate is more preferred.

The amount of the rubbery polymer (a) in materials constituting the rubber-containing graft copolymer (I) is preferably 20 to 80% by weight based on 100% by weight of the total amount of the rubbery polymer (a) and the monomer mixture constituting the rubber-containing graft copolymer (I) from the standpoint of the balance between toughness and rigidity. The rubbery polymer (a) in an amount of 20% by weight or more can provide further improved toughness. The amount is more preferably not less than 30% by weight, still more preferably not less than 40% by weight. The rubbery polymer (a) in an amount of not more than 80% by weight can provide further improved rigidity. The amount is more preferably not more than 70% by weight, still more preferably not more than 60% by weight.

The amount of the vinyl cyanide monomer in the monomer mixture constituting the rubber-containing graft copolymer (I) is preferably 1 to 50% by weight. The vinyl cyanide monomer in an amount of 1% by weight or more can provide further improved rigidity and impact resistance. The amount is more preferably not less than 3% by weight, still more preferably not less than 10% by weight. The vinyl cyanide monomer in an amount of not more than 50% by weight can provide improved color tone. The amount is more preferably not more than 40% by weight, still more preferably not more than 35% by weight.

The amount of the aromatic vinyl monomer in the monomer mixture constituting the rubber-containing graft copolymer (I) is preferably 10 to 90% by weight. The aromatic vinyl monomer in an amount of not less than 10% by weight can provide improved moldability. The amount is more preferably not less than 15% by weight, still more preferably not less than 20% by weight. The aromatic vinyl monomer in an amount of not more than 90% by weight can provide further improved impact resistance. The amount is more preferably not more than 80% by weight.

The amount of the other vinyl monomer in the monomer mixture constituting the rubber-containing graft copolymer (I) is preferably not more than 79% by weight. The other vinyl monomer in an amount of not more than 79% by weight can provide further improved impact resistance.

The graft percentage of the rubber-containing graft copolymer (I) is preferably 15 to 80% by weight. A graft percentage of 15% by weight or more can provide further improved impact resistance. The graft percentage is more preferably not less than 20% by weight. A graft percentage of not more than 80% by weight can provide improved moldability, preventing flow marks from occurring during molding. The graft percentage is more preferably not more than 70% by weight. The graft percentage (%) of the rubber-containing graft copolymer (I) is expressed by the following equation:

Graft percentage (%)=[amount of vinyl polymer graft polymerized with rubber-containing graft copolymer (I)]/[rubber content in rubber-containing graft copolymer (I)]×100.

Examples of the method of preparing the rubber-containing graft copolymer (I) include polymerization methods such as emulsion polymerization, suspension polymerization, bulk polymerization, and solution polymerization. The monomers may be loaded by any method. They may be loaded in one batch at an early stage, or alternatively, to adjust the compositional distribution of the copolymer, the polymerization may be carried out while loading some or all of the monomers continuously or in several batches.

The thermoplastic resin may be a composition comprising other components together with the rubber-reinforced thermoplastic resin (A). Examples of other components include thermoplastic resins containing no rubber components such as a polycarbonate resin (B) and the vinyl (co)polymer (II) described below, the ethylene-carbon monoxide-(meth)acrylic ester copolymer (C), and resin modifiers.

The polycarbonate resin (B) can be prepared, for example, by reacting an aromatic dihydroxy compound or the aromatic dihydroxy compound plus a small amount of a polyhydroxy compound with phosgene or a carbonic acid diester. The polycarbonate resin (B) may be branched, or may be a copolymer. The polycarbonate resin (B) can provide further improved impact resistance while maintaining the flexural modulus.

Examples of aromatic dihydroxy compounds include 2,2-bis(4-hydroxyphenyl)propane (bisphenol A), tetramethyl bisphenol A, bis(4-hydroxyphenyl)-p-diisopropylbenzene, hydroquinone, resorcinol, and 4,4-dihydroxydiphenyl. Two or more of these may be used. Of these, bisphenol A is preferred.

In particular, an ABS/PC alloy in which an ABS resin and a polycarbonate (PC) resin are uniformly mixed can be preferably used. For the amounts of the ABS resin and the PC resin in the ABS/PC alloy, the amount of the PC resin is preferably 5 to 700 parts by weight, more preferably 10 to 600 parts by weight, based on 100 parts by weight of the ABS resin.

When the rubber component is the rubber-containing graft copolymer (I), the thermoplastic resin preferably comprises as a thermoplastic resin containing no rubber components a vinyl copolymer (II) obtained by copolymerization of a monomer mixture comprising at least a vinyl cyanide monomer and an aromatic vinyl monomer. The monomer mixture may further comprise, as required, a vinyl monomer copolymerizable with the vinyl cyanide monomer and the aromatic vinyl monomer.

As the vinyl cyanide monomer, the aromatic vinyl monomer, and the other copolymerizable vinyl monomer constituting the vinyl (co)polymer (II), those which have been listed as the monomer constituting the rubber-containing graft copolymer (I) can be used. The monomers constituting the vinyl (co)polymer (II) and the monomers constituting the rubber-containing graft copolymer (I) may be the same or different, and preferably, they are the same.

The amount of the vinyl cyanide monomer in the monomer mixture constituting the vinyl (co)polymer (II) is preferably 1 to 50% by weight. The vinyl cyanide monomer in an amount of 1% by weight or more can provide further improved rigidity and impact resistance. The amount is more preferably not less than 3% by weight, still more preferably not less than 10% by weight. The vinyl cyanide monomer in an amount of not more than 50% by weight can provide improved color tone. The amount is more preferably not more than 40% by weight, still more preferably not more than 35% by weight.

The amount of the aromatic vinyl monomer in the monomer mixture constituting the vinyl (co)polymer (II) is preferably 10 to 90% by weight. The aromatic vinyl monomer in an amount of not less than 10% by weight can provide improved moldability. The amount is more preferably not less than 15% by weight, still more preferably not less than 20% by weight. The aromatic vinyl monomer in an amount of not more than 90% by weight can provide further improved impact resistance. The amount is more preferably not more than 80% by weight.

The amount of the other vinyl monomer in the monomer mixture constituting the vinyl (co)polymer (II) is preferably not more than 79% by weight. The other vinyl monomer in an amount of not more than 79% by weight can provide further improved impact resistance.

The vinyl (co)polymer (II) preferably has an intrinsic viscosity at 30° C. of 0.5 to 0.9 dl/g. An intrinsic viscosity of 0.5 dl/g or more can provide further improved strength and impact resistance. The intrinsic viscosity is more preferably not less than 0.51 dl/g, still more preferably not less than 0.52 dl/g. An intrinsic viscosity of not more than 0.9 dl/g can improve the flowability of the resin composition and improve the moldability at thin parts. The intrinsic viscosity is more preferably not more than 0.89 dl/g, still more preferably not more than 0.88 dl/g. The intrinsic viscosity at 30° C. of the vinyl (co)polymer (II) refers to a value determined using a solution obtained by dissolving the vinyl (co)polymer (II) in methyl ethyl ketone at a concentration of 0.4 g/dl. The intrinsic viscosity can be adjusted to be in the above range, for example, by adjusting the amount of chain transfer agents used in polymerization to be 0.42 to 0.19 parts by weight based on 100 parts by weight of the total amount of styrene and acrylonitrile in the method of preparing the vinyl (co)polymer (II) described below.

Examples of the method of preparing the vinyl (co)polymer (II) include polymerization methods such as emulsion polymerization, suspension polymerization, bulk polymerization, and solution polymerization. The monomers may be loaded by any method. They may be loaded in one batch at an early stage, or alternatively, to adjust the compositional distribution of the copolymer, the polymerization may be carried out while loading some or all of the monomers continuously or in several batches.

Although not critical, the amounts of the rubber-containing graft copolymer (I) and the vinyl (co)polymer (II) are preferably 10 to 60 parts by weight and 40 to 90 parts by weight, respectively, based on 100 parts by weight of the total amount thereof. The rubber-containing graft copolymer (I) in an amount of 10 parts by weight or more can provide further improved impact resistance. The rubber-containing graft copolymer (I) in an amount of not less than 20 parts by weight and the vinyl (co)polymer (II) in an amount of not more than 80 parts by weight are more preferred. The rubber-containing graft copolymer (I) in an amount of not more than 60 parts by weight can provide improved moldability. The rubber-containing graft copolymer (I) in an amount of not more than 50 parts by weight and the vinyl (co)polymer (II) in an amount of not less than 50 parts by weight are more preferred.

The rubber-containing graft copolymer (I) and the vinyl (co)polymer (II) can be mixed by any method for use.

The thermoplastic resin preferably comprises the ethylene-carbon monoxide-(meth) acrylic ester copolymer (C) together with the rubber-reinforced thermoplastic resin (A). The ethylene-carbon monoxide-(meth) acrylic ester copolymer (C) can provide further improved impact resistance.

The (meth) acrylic acid ester constituting the ethylene-carbon monoxide-(meth) acrylic ester copolymer (C) may be linear or branched. The carbon number of a hydrocarbon radical constituting the ester (COOR) is preferably 1 to 18, and examples of the hydrocarbon radical include methyl, ethyl, n-propyl, n-butyl, sec-butyl, t-butyl, isobutyl, hexyl, 2-ethylhexyl, octyl, dodecyl, undecyl, and stearyl. Of these, C2-C8 groups are more preferred.

Regarding the composition ratio of the ethylene-carbon monoxide-(meth) acrylic ester copolymer (C), the amount of ethylene is preferably 10 to 85% by weight, more preferably 40 to 80% by weight; the amount of carbon monoxide is preferably 5 to 40% by weight, more preferably 5 to 20% by weight; and the amount of (meth) acrylic acid ester is preferably 10 to 50% by weight, more preferably 15 to 40% by weight. Other copolymerizable monomer(s) may be optionally copolymerized, as required. Examples of the other copolymerizable monomer include α-olefins such as propylene, aromatic vinyls, acrylic acid, diene rubbers, and silicones.

The amount of the ethylene-carbon monoxide-(meth) acrylic ester copolymer (C) is preferably 3 to 6 parts by weight based on 100 parts by weight of the total amount of the ethylene-carbon monoxide-(meth) acrylic ester copolymer (C) and the rubber-reinforced thermoplastic resin (A). The ethylene-carbon monoxide-(meth) acrylic ester copolymer (C) in an amount of 3 parts by weight or more can provide further improved impact resistance. The amount is more preferably not less than 3.5 parts by weight, still more preferably not less than 4.0 parts by weight. The ethylene-carbon monoxide-(meth) acrylic ester copolymer (C) in an amount of not more than 6 parts by weight can prevent the delamination at the surface of a molded article, facilitate the restoration of a dent in a table tennis ball made when it is batted hard, and prevent cracks. The amount is more preferably not more than 5.5 parts by weight, still more preferably not more than 5.0 parts by weight.

The thermoplastic resin preferably comprises the rubber-reinforced thermoplastic resin (A) containing a rubbery polymer (a) containing poly(butadiene-styrene); and the ethylene-carbon monoxide-(meth) acrylic ester copolymer (C); the weight percentages of the respective components based on 100% by weight of the total amount of (A) and (C) satisfying Expressions (1) and (2):

$$11.2 \leq [\text{Weight percentage of } (a)/\{\text{Weight percentage of } (A)+\text{Weight percentage of } (C)\}] \times 100 \leq 14.5 \quad (1)$$

$$[\{\text{Weight percentage of } (a)+\text{Weight percentage of } (C)\}/\{\text{Weight percentage of } (A)+\text{Weight percentage of } (C)\}] \times 100 < 18.5 \quad (2).$$

For Expression (1), when the value of [Weight percentage of (a)/{Weight percentage of (A)+Weight percentage of (C)}]×100 is 11.2 or more, further improved impact resistance can be provided, and a table tennis ball with further improved strength can be provided. The value is more preferably not less than 11.4. On the other hand, when this value is not more than 14.5, a further improved flexural modulus can be provided; further improved rigidity and hardness can be provided; the batted ball bounce can be further improved; and the dent of a ball can be more readily restored. The value is more preferably not more than 14.3.

For Expression (2), when the value of [{Weight percentage of (a)+Weight percentage of (C)}/{Weight percentage of (A)+Weight percentage of (C)}]×100 is less than 18.5, a further improved flexural modulus can be provided; further improved rigidity and hardness can be provided; the batted ball bounce can be further improved; and the dent of a ball can be more readily restored. The value is more preferably less than 18.4. The lower limit of this value is not limited to a particular value, and it is preferably not less than 14.0, more preferably not less than 14.2.

Additives may be added to the thermoplastic resin such as antioxidants such as hindered phenol-based antioxidants, sulfur-containing compound-based antioxidants, and phosphorus-containing organic compound-based antioxidants; heat stabilizers such as phenol-based heat stabilizers and acrylate-based heat stabilizers; UV absorbers such as benzotriazole-based UV absorbers, benzophenone-based UV absorbers, and salicylate-based UV absorbers; various stabilizers such as light stabilizers such as organic nickel-based light stabilizers and hindered amine light stabilizers; lubricants such as metal salts of higher fatty acids and higher fatty acid amides; plasticizers such as phthalic acid esters and phosphoric acid esters; various flame retardants such as brominated compounds, phosphoric acid esters, and red phosphorus; flame retardant aids such as antimony trioxide and antimony pentoxide; metal salts of alkylcarboxylic acids and alkylsulfonic acids; carbon black; pigments; and dyes, as long as the desired impact resistance, flexural modulus, and density are not compromised. These may be added to the extent that the desired effects are not adversely affected, in particular, to the extent that the flexural modulus according to ISO 178, the Charpy impact strength, and the density described above are satisfied. Their amount in the thermoplastic resin composition is preferably not more than 10% by weight, more preferably not more than 8% by weight.

Furthermore, various reinforcement materials and fillers may be added. These may be added to the extent that the desired effects are not adversely affected, in particular, to the extent that the flexural modulus according to ISO 178, the Charpy impact strength, and the density described above are satisfied. Their amount in the thermoplastic resin composition is preferably not more than 50% by weight, more preferably not more than 40% by weight.

In a resin composition including two or more components, the thermoplastic resin can be prepared, for example, by melt-kneading the components. The melt-kneading may be carried out by any method, for example, by using a melt-kneader equipped with a heater and a vent. Examples of the melt-kneader include extruders equipped with a cylinder and a single screw or twin screws. The heating temperature during melt-kneading is generally 200 to 300° C. The temperature gradient during melt-kneading and other conditions can be freely set as long as the desired effect is not impaired.

The table tennis ball preferably has a diameter of 39.0 mm or more and weighs 2.0 to 3.5 g. Since table tennis balls used in regular matches are required to meet the standard defined by ITTF, the diameter is more preferably 39.70 mm or more and less than 40.75 mm, still more preferably 40.00 mm to 40.60 mm. The weight is preferably 2.67 to 2.77 g.

The thermoplastic resin composition for table tennis balls will now be described. The thermoplastic resin composition preferably comprises at least a rubber-reinforced thermoplastic resin (A) containing a rubbery polymer (a); and an ethylene-carbon monoxide-(meth) acrylic ester copolymer (C), wherein the rubbery polymer (a) contains poly(butadiene-styrene); the component (A) and the component (B) being contained in an amount of 94 to 97 parts by weight and 3 to 6 parts by weight, respectively, based on 100 parts by weight of the total amount of (A) and (C), the weight percentages of the respective components based on 100% by weight of the total amount of (A) and (C) satisfying Expressions (1) and (2):

$$11.2 \leq [\text{Weight percentage of } (a)/\{\text{Weight percentage of } (A)+\text{Weight percentage of } (C)\}] \times 100 \leq 14.5 \quad (1)$$

$$[\{\text{Weight percentage of } (a)+\text{Weight percentage of } (C)\}/\{\text{Weight percentage of } (A)+\text{Weight percentage of } (C)\}] \times 100 < 18.5 \quad (2).$$

The components constituting the thermoplastic resin composition for table tennis balls are as described above for the thermoplastic resin used for the table tennis ball. Through the use of the thermoplastic resin composition, a table tennis ball having a better balance of the above-described characteristics can be obtained.

The table tennis ball can be manufactured by molding the thermoplastic resin described above or the thermoplastic resin composition for table tennis balls. Examples of the method of manufacturing the table tennis ball include injection molding and blow molding. Injection molding and blow molding can be carried out according to a conventional method. The molding temperature during injection molding is generally 200 to 280° C. The mold temperature during injection molding is generally 30 to 80° C.

One specific method of manufacturing a table tennis ball using injection molding is a method comprising molding several hollow hemispheres by injection molding, joining the hollow hemispheres obtained to form a hollow sphere, and optionally polishing the hollow sphere. Joining the hollow hemispheres can be carried out in the same manner as for conventional celluloid table tennis balls. When blow molding is used, the joining can be omitted, and the polishing can be carried out similarly to when injection molding is used.

The table tennis ball formed by molding the thermoplastic resin described above or the thermoplastic resin composition for table tennis balls not only faithfully reproduces the playing characteristics of conventional celluloid balls such as the batted ball bounce, batted ball sound, and strength, but can also avoid instability and dangerous flammability, which are the disadvantages of the celluloid balls.

EXAMPLES

Our resin compositions and table tennis balls will now be described in more detail with reference to Examples and Comparative Examples, but these examples are not intended to limit the scope of this disclosure. The table tennis balls in Examples and Comparative Examples were obtained by joining injection-molded hollow hemispheric molded articles by a method appropriate for the materials used, and those having a size meeting the standard defined in Technical Leaflet T3 of ITTF were used. It should be noted that unless otherwise specified, "%" represents % by weight, and "parts" represents parts by weight.

First, materials, and evaluation methods in Examples and Comparative Examples will be described.

(1) Average Particle Size of Rubbery Polymer (a)

The particle size at 50% cumulative weight fraction was determined from the weight percentage of creamed polybutadiene and the cumulative weight fraction of sodium alginate concentration by the sodium alginate method described in "Rubber Age Vol. 88, p. 484-490 (1960), by E. Schmidt, P. H. Biddison", i.e., by using the fact that the particle size of creamed polybutadiene varies depending on the concentration of sodium alginate.

(2) Graft Percentage of Rubber-Containing Graft Copolymer (I)

To a predetermined amount (m; 1 g) of a rubber-containing graft copolymer (I) vacuum-dried at a temperature of 80° C. for 4 hours, 100 ml of acetone was added, and the resulting mixture was refluxed in a hot water bath at a temperature of 70° C. for 3 hours. The resulting solution was centrifuged at 8800 rpm (10000 G) for 40 minutes, and then insoluble matter was filtered off. The insoluble matter was vacuum-dried at a temperature of 80° C. for 4 hours, and the weight (n) was measured. The graft percentage was calculated by the following equation, where L is a rubber content in a graft copolymer:

$$\text{Graft percentage (\%)} = \{[(n)-(m) \times L]/[(m) \times L]\} \times 100.$$

(3) Intrinsic Viscosity of Vinyl (Co)Polymer (II)

A vinyl (co)polymer (II) weighed to 0.2 g was placed into a 50-ml measuring flask, and a methyl ethyl ketone solvent was added thereto to 50 ml. Using the resulting solution of 0.4 g/dl, the intrinsic viscosity was measured with an Ubbelohde viscometer in a high temperature bath controlled at 30° C.

(4) Preparation of Type a Test Specimen

Thermoplastic resin composition pellets dried for 3 hours in a hot-air dryer at 80° C. were loaded into a molding machine SE50DU manufactured by Sumitomo Heavy Industries, Ltd. set at a cylinder temperature of 265, and injection molding was performed in accordance with ISO 294 to prepare a type A test specimen.

(5) Flexural Modulus

The flexural modulus (MPa) according to ISO 178 was measured using the type A test specimen described above.

(6) Charpy Impact Strength

The Charpy impact strength ($kJ/m^2$) according to ISO 179 was measured using the type A test specimen described above, which was V-notched in accordance with ISO 2818.

(7) Density

The density ($g/cm^3$) according to ISO 1183 was measured using the type A test specimen described above.

The materials used in Examples and Comparative Examples will now be described.

Reference Example 1 Rubber-containing Graft Copolymer (I-1)

Into a nitrogen-purged reactor, 150 parts by weight of pure water, 0.5 parts by weight of glucose, 0.5 parts by weight of sodium pyrophosphate, 0.005 parts by weight of ferrous sulfate, and 45 parts by weight (in terms of solid content) of poly(butadiene-styrene) latex (weight ratio of styrene to butadiene: 25/75) having an average particle size of 1.00 μm were loaded, and the temperature in the reactor was raised to 65° C. with stirring. The point when the inner temperature has reached 65° C. was regarded as initiation of polymerization, and 39 parts by weight of styrene, 16 parts by weight of acrylonitrile, and 0.2 parts by weight of a t-dodecyl mercaptan mixture (chain transfer agent) were continuously added over 4 hours. Concurrently, an aqueous solution including 0.2 parts by weight of cumene hydroperoxide (polymerization initiator) and potassium oleate was continuously added over 7 hours to complete the reaction.

To the resulting latex, 2,2'-methylenebis (4-methyl-6-t-butylphenol) was added in an amount of 1 part by weight per 100 parts by weight of solid latex. Subsequently, the latex was coagulated with sulfuric acid, and then the sulfuric acid was neutralized with sodium hydroxide. The resultant was washed, filtered, and then dried to obtain a powdery rubber-containing graft copolymer (I-1). The percentage of a rubbery polymer (a) in the rubber-containing graft copolymer (I-1) was 45% by weight, and the graft percentage was 30%.

Reference Example 2 Rubber-containing Graft Copolymer (I-2)

Into a nitrogen-purged reactor, 150 parts by weight of pure water, 0.5 parts by weight of glucose, 0.5 parts by weight of sodium pyrophosphate, 0.005 parts by weight of ferrous sulfate, and 60 parts by weight (in terms of solid content) of polybutadiene latex having an average particle size of 0.35 μm were loaded, and the temperature in the reactor was raised to 65° C. with stirring. The point when the inner temperature has reached 65° C. was regarded as initiation of polymerization, and 28 parts by weight of styrene, 12 parts by weight of acrylonitrile, and 0.2 parts by weight of a t-dodecyl mercaptan mixture (chain transfer agent) were continuously added over 4 hours. Concurrently, an aqueous solution including 0.2 parts by weight of cumene hydroperoxide (polymerization initiator) and potassium oleate was continuously added over 7 hours to complete the reaction. To the resulting latex, 2,2'-methylenebis (4-methyl-6-t-butylphenol) was added in an amount of 1 part by weight per 100 parts by weight of solid latex. Subsequently, the latex was coagulated with sulfuric acid, and then the sulfuric acid was neutralized with sodium hydroxide. The resultant was washed, filtered, and then dried to obtain a powdery rubber-containing graft copolymer (I-2). The percentage of a rubbery polymer (a) in the rubber-containing graft copolymer (I-2) was 60% by weight, and the graft percentage was 40%.

Reference Example 3 Vinyl Copolymer (II-1)

To a stainless-steel autoclave equipped with baffle plates and a Pfaudler impeller, a solution obtained by dissolving 0.05 parts by weight of a methyl acrylate/acrylamide copolymer, which was prepared by the radical polymerization in water described in Example 1 of JP 45-24151 B, in 165 parts by weight of ion-exchanged water was added and stirred at 400 rpm, and the system was replaced with nitrogen gas. Next, 100 parts by weight of styrene (72 parts by weight) and acrylonitrile (28 parts by weight) and a mixed solution of 0.40 parts by weight of t-dodecyl mercaptan, 0.32 parts by weight of 2,2'-azobisisobutyronitrile, and 150 parts by weight of deionized water were added into the system under stirring, and the temperature was raised to 60° C. to initiate polymerization. After the polymerization was initiated, the reaction temperature was raised to 65° C. over 15 minutes and then to 100° C. over 50 minutes. Thereafter, the system was cooled to room temperature, and polymer isolation, washing, and drying were performed to obtain a vinyl copolymer (II-1) in the form of beads. The intrinsic viscosity of the vinyl copolymer (II-1) obtained was 0.53 dl/g.

Reference Example 4 Vinyl Copolymer (II-2)

Under the same conditions as in (II-1) except that the amount of t-dodecyl mercaptan in the mixed solution was 0.39 parts by weight, the same procedure as in (II-1) was repeated to obtain a vinyl copolymer (II-2) in the form of beads. The intrinsic viscosity of the vinyl copolymer (II-2) obtained was 0.56 dl/g.

Reference Example 5 Vinyl Copolymer (II-3)

Under the same conditions as in (II-1) except that the amount of t-dodecyl mercaptan in the mixed solution was 0.34 parts by weight, the same procedure as in (II-1) was repeated to obtain a vinyl copolymer (II-3) in the form of beads. The intrinsic viscosity of the vinyl copolymer (II-3) obtained was 0.64 dl/g.

Reference Example 6 Vinyl Copolymer (II-4)

Under the same conditions as in (II-1) except that the amount of t-dodecyl mercaptan in the mixed solution was 0.25 parts by weight, the same procedure as in (II-1) was repeated to obtain a vinyl copolymer (II-4) in the form of beads. The intrinsic viscosity of the vinyl copolymer (II-4) obtained was 0.79 dl/g.

Reference Example 7 Vinyl Copolymer (II-5)

Under the same conditions as in (II-1) except that the amount of t-dodecyl mercaptan in the mixed solution was 0.23 parts by weight, the same procedure as in (II-1) was repeated to obtain a vinyl copolymer (II-5) in the form of beads. The intrinsic viscosity of the vinyl copolymer (II-5) obtained was 0.83 dl/g.

Reference Example 8 Vinyl Copolymer (II-6)

Under the same conditions as in (II-1) except that the amount of t-dodecyl mercaptan in the mixed solution was 0.16 parts by weight, the same procedure as in (II-1) was repeated to obtain a vinyl copolymer (II-6) in the form of beads. The intrinsic viscosity of the vinyl copolymer (II-6) obtained was 0.95 dl/g.

Ethylene-carbon Monoxide-(Meth) Acrylic Ester Copolymer (C)

<C> "Elvaloy" HP-4051 available from DUPONT-MITSUI POLYCHEMICALS CO., LTD. was used.

As a celluloid table tennis ball, OFFICIAL 3-STAR PREMIUM 40 mm available from Nippon Takkyu Co., Ltd. was used.

Example 1

"ABS resin" was used as a thermoplastic resin. By using polybutadiene and poly(butadiene-styrene) as a rubbery polymer and adding 5% by weight of an ethylene-carbon monoxide-(meth) acrylic ester copolymer as a resin modifier, the mechanical properties given below were provided. Hollow hemispheric molded articles obtained by injection molding were joined, and then the surface was polished to obtain a table tennis ball 40.0 mm in diameter, 2.70 g in weight, and 0.530 mm in thickness. Using the table tennis ball, table tennis was actually played. The batted ball bounce, batted ball sound, and strength comparable to those of celluloid table tennis balls were reproduced, and a table tennis play equal to that using a celluloid table tennis ball was achieved.

Flexural modulus according to ISO 178=2260 MPa
Charpy impact strength according to ISO 179=33 kJ/m$^2$
Density according to ISO 1183=1.04 g/cm$^3$

Example 2

"ABS resin" was used as a thermoplastic resin. By using polybutadiene as a rubbery polymer, the mechanical properties given below were provided. Hollow hemispheric molded articles obtained by injection molding were joined, and then the surface was polished to obtain a table tennis ball 40.0 mm in diameter, 2.70 g in weight, and 0.530 mm in thickness. Using the table tennis ball, table tennis was actually played. The batted ball bounce, batted ball sound, and strength comparable to those of celluloid table tennis balls were reproduced, and a table tennis play equal to that using a celluloid table tennis ball was achieved.

Flexural modulus according to ISO 178=2350 MPa
Charpy impact strength according to ISO 179=20 kJ/m$^2$
Density according to ISO 1183=1.04 g/cm$^3$

Example 3

"ABS resin" was used as a thermoplastic resin. By using polybutadiene as a rubbery polymer and adding 5% by weight of an ethylene-carbon monoxide-(meth) acrylic ester copolymer as a resin modifier, the mechanical properties given below were provided. Hollow hemispheric molded articles obtained by injection molding were joined, and then the surface was polished to obtain a table tennis ball 40.0 mm in diameter, 2.70 g in weight, and 0.530 mm in thickness. Using the table tennis ball, table tennis was actually played. The batted ball bounce, batted ball sound, and strength comparable to those of celluloid table tennis balls were reproduced, and a table tennis play equal to that using a celluloid table tennis ball was achieved.

Flexural modulus according to ISO 178=1900 MPa
Charpy impact strength according to ISO 179=26 kJ/m$^2$
Density according to ISO 1183=1.04 g/cm$^3$

Example 4

"ABS/PC alloy resin" was used as a thermoplastic resin. By melt-kneading an ABS resin including polybutadiene as a rubbery polymer and a PC resin, the mechanical strength properties given below were provided. Hollow hemispheric molded articles obtained by injection molding were joined, and then the surface was polished to obtain a table tennis ball 40.0 mm in diameter, 2.70 g in weight, and 0.492 mm in thickness. Using the table tennis ball, table tennis was actually played. The batted ball bounce, batted ball sound, and strength comparable to those of celluloid table tennis balls were reproduced, and a table tennis play equal to that using a celluloid table tennis ball was achieved.

Flexural modulus according to ISO 178=2180 MPa
Charpy impact strength according to ISO 179=55 kJ/m$^2$
Density according to ISO 1183=1.12 g/cm$^3$

Comparative Example 1

"Impact polypropylene" having the mechanical properties given below was used, and hollow hemispheric molded articles obtained by injection molding were joined, and then the surface was polished to obtain a table tennis ball 40.0 mm in diameter, 2.70 g in weight, and 0.616 mm in thickness. Using the table tennis ball, table tennis was actually played. The batted ball bounce and the batted ball sound were poor, as compared to those of celluloid table tennis balls, and the characteristics of celluloid table tennis balls could not be reproduced. The flexural modulus outside our range shows that the desired batted ball bounce and batted ball sound are not provided.

Flexural modulus according to ISO 178=1300 MPa
Charpy impact strength according to ISO 179=30 kJ/m$^2$
Density according to ISO 1183=0.9 g/cm$^3$

Comparative Example 2

"High-density polyethylene" having the mechanical properties given below was used, and hollow hemispheric molded articles obtained by injection molding were joined, and then the surface was polished to obtain a table tennis ball 40.0 mm in diameter, 2.70 g in weight, and 0.576 mm in thickness. Using the table tennis ball, table tennis was actually played, and a portion different from the joint of the hollow hemispheres was cracked by being hit hard. The batted ball bounce and the batted ball sound were poor, and the characteristics of celluloid table tennis balls could not be reproduced. The flexural modulus outside our range shows that the desired batted ball bounce and batted ball sound are not provided, and the Charpy impact strength outside our range shows that the strength is insufficient.

Flexural modulus according to ISO 178=1300 MPa
Charpy impact strength according to ISO 179=7 kJ/m$^2$
Density according to ISO 1183=0.96 g/cm$^3$

Comparative Example 3

"Vinyl chloride resin" having the mechanical properties given below was used, and hollow hemispheric molded articles obtained by injection molding were joined, and then the surface was polished to obtain a table tennis ball 40.0 mm in diameter, 2.70 g in weight, and 0.397 mm in thickness. Using the table tennis ball, table tennis was actually played. A portion different from the joint of the hollow hemispheres was cracked by being hit hard, and the characteristics of celluloid table tennis balls could not be reproduced. The Charpy impact strength outside our range shows that the strength is insufficient.

Flexural modulus according to ISO 178=2300 MPa
Charpy impact strength according to ISO 179=10 kJ/m$^2$
Density according to ISO 1183=1.38 g/cm$^3$

Comparative Example 4

"Cellulose acetate resin" having the mechanical properties given below was used, and hollow hemispheric molded articles obtained by injection molding were joined, and then the surface was polished to obtain a table tennis ball 40.0 mm in diameter, 2.70 g in weight, and 0.432 mm in thickness. Using the table tennis ball, table tennis was actually played, and a portion different from the joint of the hollow hemispheres was cracked by being hit hard. The batted ball bounce and the batted ball sound were poor, and the characteristics of celluloid table tennis balls could not be reproduced. The flexural modulus outside our range shows that the desired batted ball bounce and batted ball sound are not provided, and the density outside our range shows that the molded article is thin and has insufficient strength.

Flexural modulus according to ISO 178=1600 MPa
Charpy impact strength according to ISO 179=21 kJ/m$^2$
Density according to ISO 1183=1.27 g/cm$^3$

Comparative Example 5

"ABS resin" was used as a thermoplastic resin. By using polybutadiene as a rubbery polymer, the mechanical strength properties given below were provided. Hollow hemispheric molded articles obtained by injection molding were joined, and then the surface was polished to obtain a table tennis ball 40.0 mm in diameter, 2.70 g in weight, and 0.525 mm in thickness. Using the table tennis ball, table tennis was actually played. A portion different from the joint of the hollow hemispheres was cracked by being hit hard, and the characteristics of celluloid table tennis balls could not be reproduced. The Charpy impact strength outside our range shows that the strength is insufficient.

Flexural modulus according to ISO 178=2540 MPa
Charpy impact strength according to ISO 179=17 kJ/m$^2$
Density according to ISO 1183=1.05 g/cm$^3$ The results of Examples 1 to 4 and Comparative Examples 1 to 5 are shown in Table 1. In Table 1, table tennis balls which could reproduce the playing characteristics of celluloid table tennis balls were rated A, and table tennis balls which could not were rated B.

TABLE 1

| | Item | Unit | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|---|
| Thermoplastic resin | ABS resin Rubbery polymer: polybutadiene and poly(butadiene-styrene) | % by weight | 95 | — | — | — | — | — | — | — | — |
| | ABS resin Rubbery polymer: polybutadiene | % by weight | — | 100 | 95 | — | — | — | — | — | 100 |
| | ABS/PC alloy Rubbery polymer: polybutadiene | % by weight | — | — | — | 100 | — | — | — | — | — |
| | Impact polypropylene | % by weight | — | — | — | — | 100 | — | — | — | — |
| | High-density polyethylene | % by weight | — | — | — | — | — | 100 | — | — | — |
| | Vinyl chloride resin | % by weight | — | — | — | — | — | — | 100 | — | — |
| | Cellulose acetate resin | % by weight | — | — | — | — | — | — | — | 100 | — |
| Ethylene-carbon monoxide-(meth) acrylic ester copolymer | | % by weight | 5 | — | 5 | — | — | — | — | — | — |
| Properties of thermoplastic resin | Flexural modulus | MPa | 2260 | 2350 | 1900 | 2180 | 1300 | 1300 | 2300 | 1600 | 2540 |
| | Charpy impact strength | kJ/m$^2$ | 33 | 20 | 26 | 55 | 30 | 7 | 10 | 21 | 17 |
| | Density | g/cm$^3$ | 1.04 | 1.04 | 1.04 | 1.12 | 0.9 | 0.96 | 1.38 | 1.27 | 1.05 |
| Table tennis ball | Diameter | mm | 40.0 | 40.0 | 40.0 | 40.0 | 40.0 | 40.0 | 40.0 | 40.0 | 40.0 |
| | Weight | g | 2.70 | 2.70 | 2.70 | 2.70 | 2.70 | 2.70 | 2.70 | 2.70 | 2.7 |
| | Thickness | mm | 0.530 | 0.530 | 0.530 | 0.492 | 0.616 | 0.576 | 0.397 | 0.432 | 0.525 |
| Playing characteristics of table tennis ball | Batted ball bounce | — | A | A | A | A | B | B | A | B | A |
| | Batted ball sound | — | A | A | A | A | B | B | A | B | A |
| | Strength | — | A | A | A | A | A | B | B | B | B |

Examples 5 to 24, Comparative Examples 6 to 7

The materials shown in Tables 2 to 5 were mixed with a Henschel mixer at a blend ratio shown in Tables 2 to 5, and then melt-kneaded in a vented twin screw extruder PCM30 (L/D=30) with a diameter of 30 mm at a resin temperature of 250° C. to obtain thermoplastic resin composition pellets.

The results of Examples 5 to 24 and Comparative Examples 6 to 7 are shown in Tables 2 to 5. In Tables 2 to 5, table tennis balls which could reproduce the playing characteristics of celluloid table tennis balls were rated A, and table tennis balls which could not were rated B.

TABLE 2

| | Item | Unit | Example 5 | Example 6 | Example 7 | Example 8 | Example 9 | Example 10 |
|---|---|---|---|---|---|---|---|---|
| Rubber-reinforced thermoplastic resin (A) | Rubber-containing graft copolymer (I-1) | Parts by weight | 25.5 | 25.2 | 26.7 | 26.4 | 29.5 | 29.8 |
| | Rubber-containing graft copolymer (I-2) | Parts by weight | — | — | — | — | — | — |
| | Vinyl copolymer (II-1) | Parts by weight | 70.7 | 70.0 | 68.6 | 67.9 | 65.7 | 66.3 |
| | Vinyl copolymer (II-2) | Parts by weight | — | — | — | — | — | — |
| | Vinyl copolymer (II-3) | Parts by weight | — | — | — | — | — | — |
| | Vinyl copolymer (II-4) | Parts by weight | — | — | — | — | — | — |
| | Vinyl copolymer (II-5) | Parts by weight | — | — | — | — | — | — |
| | Vinyl copolymer (II-6) | Parts by weight | — | — | — | — | — | — |
| Ethylene-carbon monoxide-(meth) acrylic ester copolymer (C) | | Parts by weight | 3.8 | 4.8 | 4.8 | 5.7 | 4.8 | 3.8 |
| Weight percentage of (a)/{Weight percentage of (A) + Weight percentage of (C)} | | % by weight | 11.5 | 11.4 | 12.0 | 11.9 | 13.3 | 13.4 |

TABLE 2-continued

| Item | | Unit | Example 5 | Example 6 | Example 7 | Example 8 | Example 9 | Example 10 |
|---|---|---|---|---|---|---|---|---|
| Weight percentage of (a) + Weight percentage of (C)}/{Weight percentage of (A) + Weight percentage of (C)} | | % by weight | 15.3 | 16.1 | 16.8 | 17.5 | 18.0 | 17.3 |
| Intrinsic viscosity of vinyl copolymer (II) | | dl/g | 0.53 | 0.53 | 0.53 | 0.53 | 0.53 | 0.53 |
| Properties of thermoplastic resin | Flexural modulus | MPa | 2,340 | 2,300 | 2,260 | 2,210 | 2,150 | 2,210 |
| | Charpy impact strength | kJ/m$^2$ | 26 | 28 | 33 | 34 | 40 | 38 |
| | Density | g/cm$^3$ | 1.04 | 1.04 | 1.04 | 1.04 | 1.04 | 1.04 |
| Properties of ball | Diameter | mm | 40.00 | 40.00 | 40.0 | 40.00 | 40.00 | 40.00 |
| | Weight | g | 2.70 | 2.70 | 2.70 | 2.70 | 2.70 | 2.70 |
| | Thickness | mm | 0.53 | 0.53 | 0.53 | 0.53 | 0.53 | 0.53 |
| Playing characteristics of table tennis ball | Batted ball bounce | — | A | A | A | A | A | A |
| | Batted ball sound | — | A | A | A | A | A | A |
| | Strength | — | A | A | A | A | A | A |

TABLE 3

| Item | | Unit | Example 11 | Example 12 | Example 13 | Example 14 | Example 15 |
|---|---|---|---|---|---|---|---|
| Rubber-reinforced thermoplastic resin (A) | Rubber-containing graft copolymer (I-1) | Parts by weight | 26.7 | 26.7 | 26.7 | 26.7 | 26.7 |
| | Rubber-containing graft copolymer (I-2) | Parts by weight | — | — | — | — | — |
| | Vinyl copolymer (II-1) | Parts by weight | — | — | — | — | — |
| | Vinyl copolymer (II-2) | Parts by weight | 68.6 | — | — | — | — |
| | Vinyl copolymer (II-3) | Parts by weight | — | 68.6 | — | — | — |
| | Vinyl copolymer (II-4) | Parts by weight | — | — | 68.6 | — | — |
| | Vinyl copolymer (II-5) | Parts by weight | — | — | — | 68.6 | — |
| | Vinyl copolymer (II-6) | Parts by weight | — | — | — | — | 68.6 |
| Ethylene-carbon monoxide-(meth) acrylic ester copolymer (C) | | Parts by weight | 4.8 | 4.8 | 4.8 | 4.8 | 4.8 |
| Weight percentage of (a)/{Weight percentage of (A) + Weight percentage of (C)} | | % by weight | 12.0 | 12.0 | 12.0 | 12.0 | 12.0 |
| Weight percentage of (a) + Weight percentage of (C)}/{Weight percentage of (A) + Weight percentage of (C)} | | % by weight | 16.8 | 16.8 | 16.8 | 16.8 | 16.8 |
| Intrinsic viscosity of vinyl copolymer (II) | | dl/g | 0.56 | 0.64 | 0.79 | 0.83 | 0.95 |
| Properties of thermoplastic resin | Flexural modulus | MPa | 2,280 | 2292 | 2269 | 2,260 | 2,230 |
| | Charpy impact strength | kJ/m$^2$ | 35 | 39 | 42 | 43 | 44 |
| | Density | g/cm$^3$ | 1.04 | 1.04 | 1.04 | 1.04 | 1.04 |
| Properties of ball | Diameter | mm | 40.00 | 40.00 | 40.00 | 40.00 | 40.00 |
| | Weight | g | 2.70 | 2.70 | 2.70 | 2.70 | 2.70 |
| | Thickness | mm | 0.53 | 0.53 | 0.53 | 0.53 | 0.53 |
| Playing characteristics of table tennis ball | Batted ball bounce | — | A | A | A | A | A |
| | Batted ball sound | — | A | A | A | A | A |
| | Strength | — | A | A | A | A | A |

TABLE 4

| Item | | Unit | Example 16 | Example 17 | Example 18 | Example 19 | Example 20 |
|---|---|---|---|---|---|---|---|
| Rubber-reinforced thermoplastic resin (A) | Rubber-containing graft copolymer (I-1) | Parts by weight | 31.7 | 24.8 | 25.7 | 26.3 | 32.4 |
| | Rubber-containing graft copolymer (I-2) | Parts by weight | — | — | — | — | — |
| | Vinyl copolymer (II-1) | Parts by weight | 64.4 | 70.5 | 71.4 | 67.6 | 62.9 |
| | Vinyl copolymer (II-2) | Parts by weight | — | — | — | — | — |
| | Vinyl copolymer (II-3) | Parts by weight | — | — | — | — | — |
| | Vinyl copolymer (II-4) | Parts by weight | — | — | — | — | — |
| | Vinyl copolymer (II-5) | Parts by weight | — | — | — | — | — |
| | Vinyl copolymer (II-6) | Parts by weight | — | — | — | — | — |
| Ethylene-carbon monoxide-(meth) acrylic ester copolymer (C) | | Parts by weight | 3.8 | 4.8 | 2.9 | 6.1 | 4.8 |
| Weight percentage of (a)/{Weight percentage of (A) + Weight percentage of (C)} | | % by weight | 14.3 | 11.1 | 11.6 | 11.8 | 14.6 |
| Weight percentage of (a) + Weight percentage of (C)}/{Weight percentage of (A) + Weight percentage of (C)} | | % by weight | 18.1 | 15.9 | 14.5 | 17.9 | 19.3 |
| Intrinsic viscosity of vinyl copolymer (II) | | dl/g | 0.53 | 0.53 | 0.53 | 0.53 | 0.53 |
| Properties of thermoplastic resin | Flexural modulus | MPa | 2140 | 2,320 | 2,430 | 2,190 | 2,060 |
| | Charpy impact strength | kJ/m$^2$ | 39 | 24 | 23 | 34 | 44 |
| | Density | g/cm$^3$ | 1.04 | 1.04 | 1.04 | 1.04 | 1.04 |
| | Diameter | mm | 40 | 40.00 | 40.00 | 40.00 | 40.00 |

TABLE 4-continued

| | Item | Unit | Example 16 | Example 17 | Example 18 | Example 19 | Example 20 |
|---|---|---|---|---|---|---|---|
| Properties of ball | Weight | g | 2.7 | 2.70 | 2.70 | 2.70 | 2.70 |
| | Thickness | mm | 0.53 | 0.53 | 0.53 | 0.53 | 0.53 |
| Playing characteristics of table tennis ball | Batted ball bounce | — | A | A | A | A | A |
| | Batted ball sound | — | A | A | A | A | A |
| | Strength | — | A | A | A | A | A |

TABLE 5

| | Item | Unit | Example 21 | Example 22 | Example 23 | Example 24 | Comparative example 6 | Comparative example 7 |
|---|---|---|---|---|---|---|---|---|
| Rubber-reinforced thermoplastic resin (A) | Rubber-containing graft copolymer (I-1) | Parts by weight | 31.4 | — | — | — | — | — |
| | Rubber-containing graft copolymer (I-2) | Parts by weight | — | 41.0 | 30.5 | 26.7 | 22.9 | 19.0 |
| | Vinyl copolymer (II-1) | Parts by weight | 63.8 | 59.0 | 64.8 | 68.6 | 72.4 | 76.3 |
| | Vinyl copolymer (II-2) | Parts by weight | — | — | — | — | — | — |
| | Vinyl copolymer (II-3) | Parts by weight | — | — | — | — | — | — |
| | Vinyl copolymer (II-4) | Parts by weight | — | — | — | — | — | — |
| | Vinyl copolymer (II-5) | Parts by weight | — | — | — | — | — | — |
| | Vinyl copolymer (II-6) | Parts by weight | — | — | — | — | — | — |
| Ethylene-carbon monoxide-(meth) acrylic ester copolymer (C) | | Parts by weight | 4.8 | 0.0 | 4.8 | 4.8 | 4.8 | 4.8 |
| Weight percentage of (a)/{Weight percentage of (A) + Weight percentage of (C)} | | % by weight | 14.1 | 24.6 | 18.3 | 16.0 | 13.7 | 11.4 |
| Weight percentage of (a) + Weight percentage of (C)/{Weight percentage of (A) + Weight percentage of (C)} | | % by weight | 18.9 | 24.6 | 23.0 | 20.8 | 18.5 | 16.1 |
| Intrinsic viscosity of vinyl copolymer (II) | | dl/g | 0.53 | 0.53 | 0.53 | 0.53 | 0.53 | 0.53 |
| Properties of thermoplastic resin | Flexural modulus | MPa | 2080 | 1,800 | 1910 | 2050 | 2170 | 2,310 |
| | Charpy impact strength | kJ/m$^2$ | 42 | 27 | 31 | 25 | 19 | 13 |
| | Density | g/cm$^3$ | 1.04 | 1.04 | 1.04 | 1.04 | 1.04 | 1.04 |
| Properties of ball | Diameter | mm | 40.00 | 40.00 | 40.00 | 40.00 | 40.00 | 40.00 |
| | Weight | g | 2.70 | 2.70 | 2.70 | 2.70 | 2.70 | 2.70 |
| | Thickness | mm | 0.53 | 0.53 | 0.53 | 0.53 | 0.53 | 0.53 |
| Playing characteristics of table tennis ball | Batted ball bounce | — | A | A | A | A | A | A |
| | Batted ball sound | — | A | A | A | A | A | A |
| | Strength | — | A | A | A | A | B | B |

The following is evident from the above results.

In Examples 1 to 24, the flexural modulus, Charpy impact strength, and specific gravity necessary for a resin composition for table tennis balls are achieved. Therefore, as a result of actually playing table tennis using a table tennis ball made of the resin composition for table tennis balls, the batted ball bounce, batted ball sound, and strength comparable to those of celluloid table tennis balls were reproduced, and a table tennis play equal to that using a celluloid table tennis ball was achieved.

The comparison between Examples 5 to 15 and Example 20 shows that the elastic modulus is further improved when the weight percentages of the components based on 100% by weight of the total amount of the rubber-reinforced plastic resin (A) and the ethylene-carbon monoxide-(meth) acrylic ester copolymer (C) satisfy Expressions (1) and (2) above.

The comparison between Example 7 and Example 24 shows that the Charpy impact strength is further improved when the rubbery polymer (a) contains poly(butadiene-styrene).

The comparisons between Example 5 and Example 18, and between Example 9 and Example 19 show that the flexural modulus and the Charpy impact strength are further improved when (C) is contained in an amount of 3 to 6 parts by weight based on 100 parts by weight of the total amount of (A) and (C).

The invention claimed is:

1. A table tennis ball having a diameter of 39.0 mm or more and a weight of 2.0 to 3.5 g, and composed of a celluloid-free thermoplastic resin composition having a flexural modulus according to ISO 178 of 1650 MPa or more, a Charpy impact strength according to ISO 179 of 20 kJ/m$^2$ or more, and a density according to ISO 1183 of less than 1.20 g/cm$^3$, wherein the thermoplastic resin composition comprises a rubber-reinforced thermoplastic resin (A) containing a rubbery polymer (a), and an ethylene-carbon monoxide-(meth) acrylic ester copolymer (C); the rubbery polymer (a) contains poly(butadiene-styrene); the component (A) and the component (C) are contained in an amount of 94 to 97 parts by weight and 3 to 6 parts by weight, respectively, based on 100 parts by weight of the total amount of (A) and (C); and the weight percentages of the respective components based on 100% by weight of the total amount of (A) and (C) satisfy Expressions (1) and (2); and wherein the rubber-reinforced thermoplastic resin (A) comprises a rubber-containing graft copolymer (I) obtained by copolymerization of a monomer mixture containing a vinyl cyanide monomer and an aromatic vinyl monomer in the presence of the rubbery polymer (a) containing poly(butadiene-styrene); and a vinyl copolymer (II) obtained by copolymerization of a monomer mixture containing a vinyl cyanide monomer and an aromatic vinyl monomer;

$11.2 \leq [\text{Weight percentage of }(a)/\{\text{Weight percentage of }(A)+\text{Weight percentage of }(C)\}] \times 100 < 14.5$ (1); and

[{Weight percentage of (a)+Weight percentage of (C)}/{Weight percentage of (A)+Weight percentage of (C)}]×100<18.5   (2).

2. The table tennis ball according to claim 1, wherein the thermoplastic resin composition comprises a rubber-reinforced thermoplastic resin (A) containing a rubbery polymer (a), and a polycarbonate resin (B).

3. A table tennis ball composed of a celluloid-free thermoplastic resin composition, the thermoplastic resin composition comprising:
 a rubber-reinforced thermoplastic resin (A) containing a rubbery polymer (a); and
 an ethylene-carbon monoxide-(meth) acrylic ester copolymer (C),
 wherein
 the rubbery polymer (a) contains poly(butadiene-styrene);
 the rubber-reinforced thermoplastic resin (A) comprises a rubber-containing graft copolymer (I) obtained by copolymerization of a monomer mixture containing a vinyl cyanide monomer and an aromatic vinyl monomer in the presence of the rubbery polymer (a) containing poly(butadiene-styrene); and a vinyl copolymer (II) obtained by copolymerization of a monomer mixture containing a vinyl cyanide monomer and an aromatic vinyl monomer; and
 the component (A) and the component (C) are contained in an amount of 94 to 97 parts by weight and 3 to 6 parts by weight, respectively, based on 100 parts by weight of the total amount of (A) and (C); and the weight percentages of the components based on 100% by weight of the total amount of (A) and (C) satisfy Expressions (1) and (2):

11.2<[Weight percentage of (a)/{Weight percentage of (A)+Weight percentage of (C)}]×100<14.5   (1); and

[{Weight percentage of (a)+Weight percentage of (C)}/{Weight percentage of (A)+Weight percentage of (C)}]×100<18.5   (2).

4. The table tennis ball according to claim 3, wherein the vinyl copolymer (II) has an intrinsic viscosity of 0.5 to 0.9 dl/g.

5. The table tennis ball according to claim 1, formed by joining hollow hemispheres molded by injection molding.

6. The table tennis ball according to claim 1, formed by injection blow molding.

7. A celluloid-free thermoplastic resin composition for table tennis balls, comprising:
 a rubber-reinforced thermoplastic resin (A) containing a rubbery polymer (a); and
 an ethylene-carbon monoxide-(meth) acrylic ester copolymer (C);
 wherein
 the rubbery polymer (a) contains poly(butadiene-styrene);
 the rubber-reinforced thermoplastic resin (A) comprises a rubber-containing graft copolymer (I) obtained by copolymerization of a monomer mixture containing a vinyl cyanide monomer and an aromatic vinyl monomer in the presence of the rubbery polymer (a) containing poly(butadiene-styrene); and a vinyl copolymer (II) obtained by copolymerization of a monomer mixture containing a vinyl cyanide monomer and an aromatic vinyl monomer; and
 the component (A) and the component (C) are contained in an amount of 94 to 97 parts by weight and 3 to 6 parts by weight, respectively, based on 100 parts by weight of the total amount of (A) and (C); and the weight percentages of the components based on 100% by weight of the total amount of (A) and (C) satisfy Expressions (1) and (2):

11.2<[Weight percentage of (a)/{Weight percentage of (A)+Weight percentage of (C)}]×100<14.5   (1); and

[{Weight percentage of (a)+Weight percentage of (C)}{Weight percentage of (A)+Weight percentage of (C)}]×100 <18.5   (2).

8. The thermoplastic resin composition for table tennis balls according to claim 7, wherein the vinyl copolymer (II) has an intrinsic viscosity of 0.5 to 0.9 dl/g.

9. A method of manufacturing a table tennis ball, the method comprising injection molding the thermoplastic resin composition for table tennis balls according to claim 7 to form hollow hemispheres, and joining the hollow hemispheres to form a hollow sphere.

10. A method of manufacturing a table tennis ball, the method comprising injection blow molding the thermoplastic resin composition for table tennis balls according to claim 7 to form a hollow sphere.

11. The table tennis ball according to claim 3, formed by joining hollow hemispheres molded by injection molding.

12. The table tennis ball according to claim 3, formed by injection blow molding.

* * * * *